United States Patent [19]

Wiesel et al.

[11] 4,055,557
[45] Oct. 25, 1977

[54] SULFONAMIDOBENZENE-AZO-AMINOPYRAZOLE DYESTUFFS

[75] Inventors: Manfred Wiesel; Richard Sommer, both of Leverkusen, Germany

[73] Assignee: Bayer Aktiengesellschaft, Leverkusen, Germany

[21] Appl. No.: 387,315

[22] Filed: Aug. 10, 1973

[30] Foreign Application Priority Data

Aug. 12, 1972 Germany ............................ 2239814

[51] Int. Cl.² ............................................ C09B 29/38
[52] U.S. Cl. ..................................... 260/162; 260/163; 260/458 C; 260/507 R
[58] Field of Search ................................. 260/162, 163

[56] References Cited

U.S. PATENT DOCUMENTS

| | | | |
|---|---|---|---|
| 1,874,474 | 8/1932 | Eichwede et al. | 260/162 |
| 1,876,884 | 9/1932 | Eichwede et al. | 260/162 |
| 1,893,553 | 1/1933 | Knecht et al. | 260/162 |
| 2,015,225 | 9/1935 | Kracker et al. | 260/162 X |
| 2,024,864 | 12/1935 | Kopp et al. | 260/162 |
| 2,073,728 | 3/1937 | Bohi | 260/162 |
| 2,152,007 | 3/1939 | Winkeler et al. | 260/162 |
| 2,220,598 | 11/1940 | Fischer | 260/162 X |
| 2,572,394 | 10/1951 | Ruckstuhl et al. | 260/162 |
| 2,788,342 | 4/1957 | Buehler et al. | 260/162 X |
| 2,789,975 | 4/1957 | Ruckstuhl | 260/163 X |
| 2,839,521 | 6/1958 | Schetty | 260/162 X |
| 2,897,189 | 7/1959 | Fasciati | 260/162 X |
| 3,136,752 | 6/1964 | Jung et al. | 260/163 X |
| 3,139,420 | 6/1964 | Beffa et al. | 260/193 X |
| 3,144,437 | 8/1964 | Uehlinger | 260/162 X |
| 3,324,105 | 6/1967 | Hanke et al. | 260/162 X |
| 3,344,133 | 9/1967 | Bossard et al. | 260/162 X |
| 3,379,715 | 4/1968 | Chiddix et al. | 260/162 X |
| 3,514,439 | 5/1970 | Wehrli et al. | 260/162 X |
| 3,518,245 | 6/1970 | Meininger et al. | 260/191 X |
| 3,528,961 | 9/1970 | Miles et al. | 260/162 |
| 3,542,753 | 11/1970 | Brenneisen | 260/162 X |

FOREIGN PATENT DOCUMENTS

| | | | |
|---|---|---|---|
| 643,924 | 6/1964 | Belgium | 260/163 |
| 1,150,769 | 6/1963 | Germany | 260/163 |
| 1,130,949 | 6/1962 | Germany | 260/162 |
| 419,388 | 3/1967 | Switzerland | 260/163 |
| 868,474 | 5/1961 | United Kingdom | 260/162 |

Primary Examiner—Charles F. Warren
Attorney, Agent, or Firm—Plumley and Tyner

[57] ABSTRACT

Monoazo dyestuffs of the formula

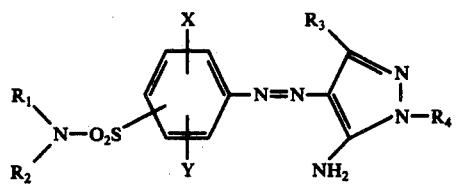

wherein $R_1$ = hydrogen, alkyl, cycloalkyl, aralkyl or aryl, $R_2$ = sulphoalkyl, sulfoaryl, sulphoalkylaryl or sulphatoalkyl, $R_3$ = alkyl, aryl, carboxy, carbonamide or carboxylic acid ester, $R_4$ = hydrogen, alkyl, cycloalkyl, aryl, aralkyl, or the radical of a heterocyclic compound, X = hydrogen, halogen, nitrile, alkyl, alkoxy, trifluoromethyl, nitro, carbonamide or carboxylic ester and Y = hydrogen, halogen, alkoxy or acylamino. The dyestuffs are useful for dyeing natural and synthetic fiber materials.

6 Claims, No Drawings

SULFONAMIDOBENZENE-AZO-AMINOPYRAZOLE DYESTUFFS

The present invention relates to new, valuable monoazo dyestuffs which in the form of the free acid correspond to the general formula

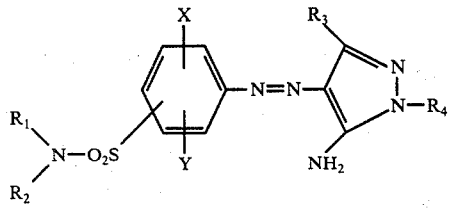

wherein
- $R_1$ = hydrogen or an alkyl, cycloalkyl, aralkyl or aryl group,
- $R_2$ = sulphoalkyl, sulphoaryl, sulphoalkyl-aryl or sulphato-alkyl,
- $R_3$ = an alkyl or aryl group, the carboxyl group, a carbonamide group or a carboxylic ester group,
- $R_4$ = hydrogen, an alkyl, cycloalkyl, aryl or aralkyl group or the radical of a heterocyclic compound,
- X = hydrogen, halogen, nitrile, alkyl, alkoxy, trifluoromethyl, nitro, carbonamide or carboxylic ester groups and
- Y = hydrogen, halogen, alkoxy or acylamino, as well as their manufacture and use for dyeing natural and synthetic fibre materials.

The alkyl groups preferably contain 1 – 6 C atoms and can possess further substituents, such as, for example, hydroxyl, chlorine, bromine, nitrile, carbamoyl, alkoxy and alkoxycarbonyl.

Suitable alkyl groups $R_1$, $R_3$ and X are, in particular, unsubstituted $C_1$-$C_4$-alkyl radicals, such as $CH_3$, $C_2H_5$, i-$C_3H_7$, n-$C_4H_9$ and i-$C_4H_9$. Suitable alkyl groups $R_4$ are, in particular, $C_1$-$C_4$-alkyl radicals, for example $CH_3$, $C_2H_5$, n- and iso-$C_3H_7$, and n-, sec.- and iso-$C_4H_9$, which can be substituted further, for example by hydroxyl, chlorine, bromine, nitrile, carbamoyl, alkoxy, especially $C_1$-$C_4$-alkoxy, and alkoxycarbonyl, especially $C_1$-$C_4$-alkoxycarbonyl.

Examples of suitable cycloalkyl radicals $R_1$ and $R_4$ are cyclopentyl and cyclohexyl radicals.

Examples of suitable heterocyclic radicals $R_4$ are the 3-sulpholanyl radical or the 2-furfuryl radical.

Examples of suitable aralkyl radicals $R_1$ and $R_4$ are benzyl or 2-phenylethyl.

Suitable aryl radicals $R_1$, $R_3$ and X are preferably phenyl radicals which can be substituted, for example by halogen, alkyl groups or alkoxy groups, especially phenyl and o-, m- and p-tolyl.

Suitable aryl radicals $R_4$ are preferably phenyl radicals which can optionally be substituted by non-ionic substituents, such as, for example, fluorine, chlorine, bromine, nitrile, nitro, acylamino, $C_1$-$C_4$-alkyl, trifluoromethyl, $C_1$-$C_4$-alkoxy or amino groups which are optionally substituted by alkyl groups.

Examples of suitable sulphoalkyl radicals $R_2$ are 2-sulphoethyl, 2-sulphopropyl, 3-sulphopropyl, 2-sulphobutyl, 3-sulphobutyl and 4-sulphobutyl.

Examples of suitable sulphoaryl radicals $R_2$ are sulphophenyl radicals which are optionally substituted further, such as 2-, 3- and 4-sulphophenyl, 2-methyl-4-sulphophenyl, 2-methyl-5-sulphophenyl, 2-chloro-4-sulphophenyl, 2-chloro-5-sulphophenyl and 4-chloro-2-sulphophenyl.

Examples of suitable sulphatoalkyl radicals $R_2$ are the sulphuric acid half-esters of 2-hydroxyethyl, 2-hydroxypropyl, 3-hydroxypropyl, 4-hydroxybutyl and 3-hydroxybutyl.

Examples of suitable sulphoalkylaryl radicals $R_2$ are sulphoalkylphenyl radicals, such as 2-, 3- and 4-sulphomethylphenyl.

Examples of suitable halogen atoms X and Y are chlorine and bromine.

Suitable alkoxy groups X and Y are preferably those with 1-4 C atoms. As examples there may be mentioned: -$OCH_3$, -$OC_2H_5$, -$OC_3H_7$ and -$OC_4H_9$.

Examples of suitable carbonamide radicals X and $R_3$ are those which correspond to the formula

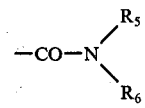

wherein
- $R_5$ = hydrogen, methyl, ethyl, propyl or butyl and
- $R_6$ = hydrogen, methyl, ethyl, propyl or butyl.

As examples there may be mentioned: carbonamide, N-methyl-carbonamide, N,N-dimethyl-carbonamide, N-ethyl-carbonamide and N,N-diethyl-carbonamide.

Examples of suitable carboxylic ester groups X and $R_3$ are the carboxylic acid methyl ester, carboxylic acid ethyl ester, carboxylic acid butyl ester and carboxylic acid propyl ester groups.

Examples of suitable acylamino groups Y are saturated alkylcarbonylamino groups, preferably those with 1-4 C atoms in the alkyl group such as, for example, formylamino, acetylamino, propionylamino and butyrylamino, and also arylcarbonylamino, especially phenylcarbonylamino or benzylcarbonylamino, wherein the phenyl radicals can be substituted further by non-ionic substituents, and also saturated alkylsulphonylamino radicals wherein the alkyl groups preferably possess 1 – 4 C atoms, for example methylsulphonylamino, ethylsulphonylamino, propylsulphonylamino, butylsulphonylamino and phenylsulphonylamino.

Within the scope of the formula (I), preferred dyestuffs are those which in the form of the free acid correspond to the formula

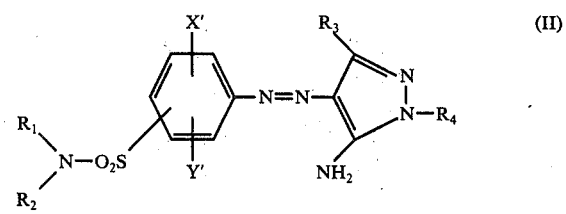

wherein
- $R_1$, $R_2$, $R_3$ and $R_4$ have the abovementioned meaning,
- X' represents hydrogen, chlorine, bromine or trifluoromethyl and
- Y' represents hydrogen, chlorine or bromine especially those which in the form of the free acid correspond to the formula

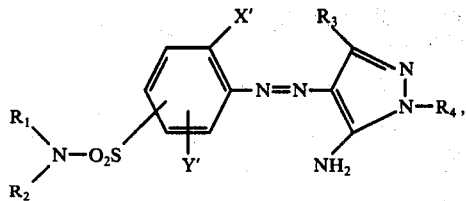

(III)

wherein

R$_1$, R$_2$, R$_3$, X' and Y' have the abovementioned meaning and

R$_4$' represents an aryl group.

Dyestuffs which are very particularly preferred are those which in the form of the free acid correspond to the formula

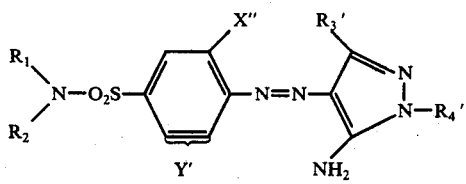

(IV)

wherein

R$_1$, R$_2$, R$_4$' and Y' have the abovementioned meaning,

X" represents chlorine, bromine or trifluoromethyl and

R$_3$' represents a methyl group.

The dyestuffs according to the invention, of the formula (I), are obtained by diazotising diazo components of the formula

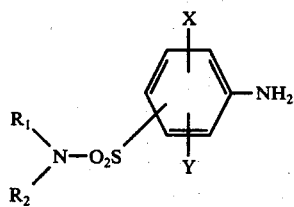

(V)

wherein

R$_1$, R$_2$, X and Y have the abovementioned meaning according to methods known from the literature and coupling the product with coupling components of the general formula

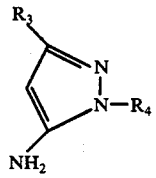

(VI)

wherein

R$_3$ and R$_4$ have the abovementioned meaning, according to processes known from the literature.

Dyestuffs of the formula (I) in which R$_2$ represents a sulphatoalkyl radical can furthermore also be obtained by esterifying with sulphuric acid the aliphatic hydroxyl group in the sulphonamide radical in dyestuffs of the formula

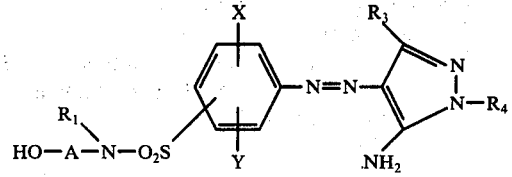

(VII)

wherein

X, Y, R$_1$, R$_3$ and R$_4$ have the abovementioned meaning and

A represents an alkylene group.

Examples of suitable diazo components of the formula (V) are the sulphuric acid half-esters of the following hydroxyalkylsulphonamides: 4-amino-2-chloro-benzenesulphonic acid (N-2-hydroxyethyl)-amide, 4-amino-3-chloro-benzenesulphonic acid (N-2-hydroxyethyl)-amide, 4-amino-2,5-dichloro-benzenesulphonic acid (N-2-hydroxyethyl)-amide, 4-amino-3,5-dichloro-benzenesulphonic acid (N-2-hydroxyethyl)-amide, 4-amino-3-methyl-benzenesulphonic acid (N-2-hydroxyethyl)-amide, 4-amino-3-trifluoromethyl-benzenesulphonic acid (N-2-hydroxyethyl)-amide, 4-amino-2,5-dichloro-benzenesulphonic acid (N-3-hydroxypropyl)-amide, 4-amino-3,5-dichloro-benzenesulphonic acid (N-3-hydroxypropyl)-amide, 4-amino-2-chloro-benzenesulphonic acid (N-3-hydroxybutyl)-amide, 4-amino-2,5-dichloro-benzenesulphonic acid (N-3-hydroxybutyl)-amide, 4-amino-3-methoxy-benzenesulphonic acid (N-3-hydroxybutyl)-amide, 4-amino-2-chloro-benzenesulphonic acid (N-2-hydroxyethyl-N-methyl)-amide, 4-amino-3-chloro-benzenesulphonic acid (N-2-hydroxyethyl-N-methyl)-amide, 4-amino-2,5-dichloro-benzenesulphonic acid (N-2-hydroxyethyl-N-methyl)-amide, 4-amino-3,5-dichloro-benzenesulphonic acid (N-2-hydroxyethyl-N-methyl)-amide, 4-amino-3-trifluoromethyl-benzenesulphonic acid (N-2-hydroxyethyl-N-methyl)-amide, 4-amino-3-chloro-benzenesulphonic acid (N-3-hydroxypropyl-N-methyl)-amide, 4-amino-2,5-dichloro-benzenesulphonic acid (N-3-hydroxypropyl-N-methyl)-amide, 4-amino-3,5-dichloro-benzenesulphonic acid (N-3-hydroxypropyl-N-methyl)-amide, 4-amino-2-chloro-benzenesulphonic acid (N-3-hydroxybutyl-N-methyl)-amide, 4-amino-2,5-dichloro-benzenesulphonic acid (N-3-hydroxybutyl-N-methyl)-amide, 4-amino-3,5-dichloro-benzenesulphonic acid (N-3-hydroxybutyl-N-methyl)-amide, 4-amino-2,5-dichloro-benzenesulphonic acid (N-2-hydroxyethyl-N-ethyl)-amide, 4-amino-3,5-dichloro-benzenesulphonic acid (N-2-hydroxyethyl-N-ethyl)-amide, 4-amino-3-ethoxy-benzenesulphonic acid (N-2-hydroxyethyl-N-ethyl)-amide, 4-amino-2,5-dichloro-benzenesulphonic acid (N-3-hydroxypropyl-N-ethyl)-amide, 4-amino-2,5-dichloro-benzenesulphonic acid (N-3-hydroxybutyl-N-ethyl)-amide, 4-amino-2,5-dichloro-benzenesulphonic acid (N-2-hydroxyethyl-N-propyl)-amide, 4-amino-3-chloro-benzenesulphonic acid (N-2-hydroxyethyl-N-benzyl)-amide, 4-amino-2,5-dichloro-benzenesulphonic acid (N-2-hydroxyethyl-N-benzyl)-amide, 4-amino-3,5-dichloro-benzenesulphonic acid (N-2-hydroxyethyl-N-benzyl)-amide, 4-amino-3-methoxy-benzenesulphonic acid (N-2-hydroxyethyl-N-benzyl)-amide, 4-amino-3-trifluoromethyl-benzenesulphonic acid (N-2-hydroxyethyl-N-benzyl)-amide, 4-amino-2,5-dichloro-benzenesulphonic acid (N-3-hydroxypropyl-N-benzyl)-amide, 4-amino-3,5-dichloro-benzenesulphonic acid (N-3-hydroxypropyl-N-benzyl)-amide, 4-amino-2,5-dichlorobenzenesulphonic acid (N-2-hydroxyethyl-N-2-phenethyl)-amide, 4-amino-3,5-dichloro-benzenesulphonic acid (N-2-hydroxyethyl-N-2-phenethyl)-amide, 3-amino-4-chloro-benzenesulphonic acid (N-2-hydroxyethyl)-amide, 3-amino-4-chloro-benzenesulphonic acid (N-2-hydroxyethyl-N-methyl)-amide, 3-amino-6-methoxy-benzenesulphonic acid (N-2-hydroxyethyl)-amide, 3-amino-4-methoxy-benzenesulphonic acid (N-3-hydroxypropyl-N-methyl-amide, 4-amino-2,5-dichloro-benzenesulphonic acid (N-2-hydroxyethyl-N-phenyl)-amide, 4-amino-3,5-dichloro-benzenesulphonic acid (N-2-hydroxyethyl-N-m-tolyl)-amide, 4-amino-2,5-dichloro-benzenesulphonic acid (N-2-hydroxyethyl-N-3-methoxy-phenyl)-amide and 4-amino-2,5-dichloro-benzenesulphonic acid (N-2-hydroxyethyl-N-3-ethyl-phenyl)-amide.

Examples of further suitable diazo components of the formula (V) are: N-(4-amino-phenyl-sulphonyl)-2-amino-ethanesulphonic acid, N-methyl-N-(4-amino-phenyl-sulphonyl)-2-aminoethanesulphonic acid, N-propyl-N-(4-amino-phenyl-sulphonyl)-2-aminoethanesulphonic acid, N-(4-amino-2-chloro-phenyl-sulphonyl)-2-aminoethanesulphonic acid, N-ethyl-N-(4-amino-2-chloro-phenyl-sulphonyl)-2-aminoethanesulphonic acid, N-(4-amino-3-chloro-phenyl-sulphonyl)-2-aminoethanesulphonic acid, N-methyl-N-(4-amino-3-chloro-phenyl-sulphonyl)-2-aminoethanesulphonic acid, N-ethyl-N-(4-amino-3-chloro-phenyl-sulphonyl)-2-aminoethanesulphonic acid, N-(4-amino-2,5-dichloro-phenyl-sulphonyl)-2-aminoethanesulphonic acid, N-methyl-N-(4-amino-2,5-dichloro-phenyl-sulphonyl)-2-aminoethanesulfonic acid, N-ethyl-N-(4-amino-2,5-dichloro-phenyl-sulphonyl)-2-aminoethanesulphonic acid, N-propyl-N-(4-amino-2,5-dichloro-phenyl-sulphonyl)-2-aminoethanesulphonic acid, N-(4-amino-3,5-dichloro-phenyl-sulphonyl)-2-aminoethanesulphonic acid, N-methyl-N-(4-amino-3,5-dichloro-phenyl-sulphonyl)-2-aminoethanesulphonic acid, N-(4-amino-3-methyl-phenyl-sulphonyl)-2-aminoethanesulphonic acid, N-(4-amino-3-methoxy-phenyl-sulphonyl)-2-aminoethanesulphonic acid, N-methyl-N-(4-amino-3-methoxy-phenyl-sulphonyl)-2-aminoethanesulphonic acid, N-(4-amino-3-ethoxy-phenyl-sulphonyl)-2-aminoethanesulphonic acid, N-(4-amino-3-trifluoromethyl-phenyl-sulphonyl)-2-aminoethanesulphonic acid, N-methyl-N-(4-amino-3-trifluoromethyl-phenyl-sulphonyl)-2-aminoethanesulphonic acid, N-propyl-N-(4-amino-3-trifluoromethyl-phenyl-sulphonyl)-2-aminoethanesulphonic acid, N-(4-amino-phenyl-sulphonyl)-3-aminopropylsulphonic acid, N-methyl-N-(4-amino-phenyl-sulphonyl)-3-aminopropylsulphonic acid, N-(4-amino-2-chloro-phenyl-sulphonyl)-3-aminopropylsulphonic acid, N-ethyl-N-(4-amino-3-chloro-phenyl-sulphonyl)-3-aminopropylsulphonic acid, N-(4-amino-2,5-dichloro-phenyl-sulphonyl)-3-aminopropylsulphonic acid, N-methyl-N-(4-amino-2,5-dichloro-phenyl-sulphonyl)-3-aminopropylsulphonic acid, N-(4-amino-3,5-dichloro-phenyl-sulphonyl)-3-aminopropylsulphonic acid, N-methyl-N-(4-amino-3,5-dichloro-phenyl-sulphonyl)-3-aminopropylsulphonic acid, N-propyl-N-(4-amino-3,5-dichloro-phenyl-sulphonyl)-3-aminopropylsulphonic acid, N-methyl-N-(4-amino-3-methyl-phenyl-sulphonyl)-3-aminopropylsulphonic acid, N-(4-amino-3-trifluoromethyl-phenyl-sulphonyl)-3-aminopropylsulphonic acid, N-(4-amino-phenyl-sulphonyl)-3-aminobutylsulphonic acid, N-(4-amino-2,5-dichloro-phenyl-sulphonyl)-3-aminobutylsulphonic acid, N-methyl-N-(4-amino-2,5-dichloro-phenyl-sulphonyl)-3-aminobutylsulphonic acid, N-(4-amino-3,5-dichloro-phenyl-sulphonyl)-3-aminobutylsulphonic acid, N-methyl-N-(4-amino-3,5-dichloro-phenyl-sulphonyl)-3-aminobutylsulphonic acid, N-ethyl-N-(4-amino-3,5-dichloro-phenyl-sulphonyl)-3-aminobutylsulphonic acid, N-ethyl-N-(4-amino-3-methyl-phenyl-sulphonyl)-3-aminobutylsulphonic acid, N-methyl-N-(4-amino-3-methoxy-phenyl-sulphonyl)-3-aminobutylsulphonic acid, N-(4-amino-3-trifluoromethyl-phenyl-sulphonyl)-3-aminobutylsulphonic acid, N-methyl-N-(4-amino-3-trifluoromethyl-phenyl-sulphonyl)-3-aminobutylsulphonic acid, N-(4-amino-phenyl-sulphonyl)-4-aminobutylsulphonic acid, N-methyl-N-(4-amino-phenyl-sulphonyl)-4-aminobutylsulphonic acid, N-(4-amino-2-chloro-phenyl-sulphonyl)-4-aminobutylsulphonic acid, N-(4-amino-3-chloro-phenyl-sulphonyl)-4-aminobutylsulphonic acid, N-(4-amino-2,5-dichloro-phenyl-sulphonyl)-4-aminobutylsulphonic acid, N-methyl-N-(4-amino-2,5-dichloro-phenyl-sulphonyl)-4-aminobutylsulphonic acid, N-(4-amino-3,5-dichloro-phenyl-sulphonyl)-4-aminobutylsulphonic acid, N-(4-amino-3-trifluoromethyl-phenyl-sulphonyl)-4-aminobutylsulphonic acid, N-methyl-N-(4-amino-3-trifluoromethyl-phenyl-sulphonyl)-4-aminobutylsulphonic acid, N-(4-amino-phenyl-sulphonyl)-3-aminophenylsulphonic acid, N-methyl-N-(4-amino-2-chloro-phenyl-sulphonyl)-3-aminophenylsulphonic acid, N-ethyl-N-(4-amino-3-chloro-phenyl-sulphonyl)-3-aminophenylsulphonic acid, N-(4-amino-2,5-dichloro-phenyl-sulphonyl)-3-aminophenylsulphonic acid, N-methyl-N-(4-amino-2,5-dichloro-phenyl-sulphonyl)-3-aminophenylsulphonic acid, N-methyl-N-(4-amino-3,5-dichloro-phenyl-sulphonyl)-3-aminophenylsulphonic acid, N-propyl-N-(4-amino-3,5-dichloro-phenyl-sulphonyl)-3-aminophenylsulphonic acid, N-(4-amino-3-methyl-phenyl-sulphonyl)-3-aminophenylsulphonic acid, N-(4-amino-3-methoxy-phenyl-sulphonyl)-3-aminophenylsulphonic acid, N-(4-amino-3-trifluoromethyl-phenyl-sulphonyl)-3-aminophenylsulphonic acid, N-(4-amino-phenyl-sulphonyl)-4-aminophenylsulphonic acid, N-(4-amino-2-chloro-phenyl-sulphonyl)-4-aminophenylsulphonic acid, N-methyl-N-(4-amino-3-chloro-phenyl-sulphonyl)-4-aminophenylsulphonic acid, N-(4-amino-2,5-dichloro-phenyl-sulphonyl)-4-aminophenylsulphonic acid, N-methyl-N-(4-amino-2,5-dichloro-phenyl-sulphonyl)-4-aminophenylsulphonic acid, N-ethyl-N-(4-amino-2,5-dichloro-phenyl-sulphonyl)-4-aminophenylsulphonic acid, N-methyl-N-(4-amino-3,5-dichloro-phenyl-sulphonyl)-4-aminophenylsulphonic acid, N-(4-amino-3-methyl-phenyl-sulphonyl)-4-aminophenylsulphonic acid, N-(4-amino-3-methoxy-phenyl-sulphonyl)-4-aminophenylsulphonic acid, N-(4-amino-3-trifluoromethyl-phenyl-sulphonyl)-4-aminophenylsulphonic acid, N-(4-amino-phenyl-sulphonyl)-3-aminophenylmethanesulphonic acid, N-ethyl-N-(4-amino-phenyl-sulphonyl)-3-aminophenylmethanesulphonic acid, N-(4-amino-2-chloro-phenyl-sulphonyl)-3-aminophenylmethanesulphonic acid, N-(4-amino-3-chloro-phenyl-sulphonyl)-3-aminophenylmethanesulphonic acid, N-(4-amino-2,5-dichloro-phenyl-sulphonyl)-3-aminophenylmethanesulphonic acid, N-methyl-N-(4-amino-2,5-dichloro-phenyl-sulphonyl)-3-aminophenylmethanesulphonic acid, N-ethyl-N-(4-amino-2,5-dichloro-phenyl-sulphonyl)-3-aminophenylmethanesulphonic acid, N-methyl-N-(4-amino-3,5-dichloro-phenyl-sulphonyl)-3-aminophenylmethanesulphonic acid, N-(4-amino-3-trifluoromethyl-phenyl-sulphonyl)-3-aminophenylmethanesulphonic acid, N-(4-amino-phenyl-sulphonyl)-4-aminophenylmethanesulphonic acid, N-(4-amino-2,5-dichloro-phenyl-sulphonyl)-4-aminophenylmethanesulphonic acid, N-methyl-N-(4-amino-2,5-dichloro-phenyl-sulphonyl)-4-aminophenylmethanesulphonic acid, N-(4-amino-3-ethoxy-phenyl-sulphonyl)-4-aminophenylmethanesulphonic acid, N-(4-amino-3-trifluoromethyl-phenyl-sulphonyl)-4-aminophenylmethanesulphonic acid, N-(4-amino-2-chloro-phenyl-sulphonyl)-3-amino-4-methylphenylsulphonic acid, N-(4-amino-3-chloro-phenyl-sulphonyl)-3-amino-4-methylphenylsulphonic acid, N-(4-amino-2,5-dichloro-phenyl-sulphonyl)-3-amino-4-methylphenylsulphonic acid, N-methyl-N-(4-amino-2,5-dichloro-phenyl-sulphonyl)-3-amino-4-methylphenylsulphonic acid, N-ethyl-N-(4-amino-2,5-dichloro-phenyl-sulphonyl)- 3-amino-4-methylphenylsulphonic acid, N-(4-amino-3,5-dichloro-phenyl-sulphonyl)-3-amino-4-methylphenylsulphonic acid, N-(4-amino-3-trifluoromethyl-phenyl-sulphonyl)-3-amino-4-methylphenylsulphonic acid, N-(4-amino-phenyl-sulphonyl)-4-amino-3-methylphenylsulphonic acid, N-(4-amino-2,5-dichloro-phenyl-sulphonyl)-4-amino-3-methylphenylsulphonic acid, N-(4-amino-3-trifluoromethyl-phenyl-sulphonyl)-4-amino-3-methylphenylsulphonic acid, N-(4-amino-phenyl-sulphonyl)-3-amino-4-methoxyphenylsulphonic acid, N-(4-amino-2,5-dichloro-phenyl-sulphonyl)-3-amino-4-methoxyphenylsulphonic acid, N-(4-amino-3,5-dichloro-phenyl-sulphonyl)-3-amino-4-methoxyphenylsulphonic acid, N-(4-amino-3-trifluoromethyl-phenyl-sulphonyl)-3-amino-4-methoxyphenylsulphonic acid, N-(4-amino-2-chloro-phenyl-sulphonyl)-4-amino-3-methoxyphenylsulphonic acid, N-(4-amino-3-methyl-phenyl-sulphonyl)-4-amino-3-methoxyphenylsulphonic acid, N-(4-amino-3-methoxy-phenyl-sulphonyl)-4-amino-3-methoxyphenylsulphonic acid, N-(4-amino-2-chloro-phenyl-sulphonyl)-5-amino-2-methoxyphenylsulphonic acid, N-(4-amino-2,5-dichloro-phenyl-sulphonyl)-5-amino-2-methoxyphenylsulphonic acid, N-methyl-N-(4-amino-2,5-dichloro-phenyl-sulphonyl)-5-amino-2-methoxyphenylsulphonic acid, N-(4-amino-2,5-dichloro-phenyl-sulphonyl)-5-amino-2-ethoxyphenylsulphonic acid, N-methyl-N-(4-amino-2,5-dichloro-phenyl-sulphonyl)-5-amino-2-ethoxyphenylsulphonic acid, N-(4-amino-phenyl-sulphonyl)-5-amino-2-phenoxyphenylsulphonic acid, N-methyl-N-(4-amino-3-chloro-phenyl-sulphonyl)-5-amino-2-phenoxyphenylsulphonic acid, N-(4-amino-2,5-dichloro-phenyl-sulphonyl)-5-amino-2-phenoxyphenylsulphonic acid, N-methyl-N-(4-amino-2,5-dichloro-phenyl-sulphonyl)-5-amino-2-phenoxyphenylsulphonic acid, N-(4-amino-3,5-dichloro-phenyl-sulphonyl)-5-amino-2-phenoxyphenylsulphonic acid, N-ethyl-N-(4-amino-3,5-dichloro-phenyl-sulphonyl)-5-amino-2-phenoxyphenylsulphonic acid, N-(4-amino-3-trifluoromethyl-phenyl-sulphonyl)-5-amino-2-phenoxyphenylsulphonic acid, N-methyl-N-(4-amino-phenyl-sulphonyl)-3-amino-4-chlorophenylsulphonic acid, N-(4-amino-2,5-dichloro-phenyl-sulphonyl)-3-amino-4-chlorophenylsulphonic acid, N-(4-amino-2,5-dichloro-phenyl-sulphonyl)-4-amino-3-chlorophenylsulphonic acid, N-(4-amino-phenyl-sulphonyl)-3-aminomethanephenylsulphonic acid, N-(4-amino-2-chloro-phenyl-sulphonyl)-3-aminomethanephenylsulphonic acid, N-(4-amino-2,5-dichloro-phenyl-sulphonyl)-3-aminomethanephenylsulphonic acid, N-methyl-N-(4-amino-2,5-dichloro-phenyl-sulphonyl)-3-aminomethanephenylsulphonic acid, N-(4-amino-3-trifluoromethyl-phenyl-sulphonyl)-3-aminomethanephenylsulphonic acid, N-ethyl-N-(4-amino-phenyl-sulphonyl)-4-aminomethanephenylsulphonic acid, N-(4-amino-2,5-dichloro-phenyl-sulphonyl)-4-aminomethanephenylsulphonic acid, N-methyl-N-(4-amino-2,5-dichloro-phenyl-sulphonyl)-4-aminomethanephenylsulphonic acid and N-(4-amino-3-trifluoromethyl-phenyl-sulphonyl)-4-aminomethanephenylsulphonic acid.

The diazo components of the general formula (V) are obtained by amidising acetylaminobenzenesulphochlorides or nitrobenzenesulphochlorides with amines of the formula

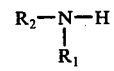

wherein $R_1$ and $R_2$ have the abovementioned meaning and splitting off the acetyl group or converting the nitro group into the amino group by reduction.

The sulphuric acid half-esters of the formula (V) in which $R_2$ thus represents a sulphatoalkyl group are obtained by esterification of the corresponding hydroxyalkylsulphonamides of the formula (V), in which $R_2$ represents a hydroxyalkyl group, with sulphuric acid.

Examples of suitable coupling components of the formula (VI) are 1-isopropyl-3-methyl-5-aminopyrazole, 1-($\beta$-hydroxyethyl)-3-methyl-5-aminopyrazole, 1,3-dimethyl-5-aminopyrazole, 1-methyl-3-phenyl-5-aminopyrazole, 1-ethyl-3-methyl-5-aminopyrazole, 1-(2'-furfuryl)-3-methyl-5-aminopyrazole, 1-($\beta$-cyanoethyl)-3-methyl-5-aminopyrazole, 1-($\alpha$-phenylethyl)-3-methyl-5-aminopyrazole, 1-isobutyl-3-methyl-5-aminopyrazole, 1-(1,2-dimethyl-n-propyl)-3-methyl-5-aminopyrazole, 1-benzyl-3-methyl-5-aminopyrazole, 1-phenyl-3-ethyl-5-aminopyrazole, 1-(3'-methoxyphenyl)-3-methyl-5-aminopyrazole, 1-(2'-methylphenyl)-3-methyl-5-aminopyrazole, 1-(4'-aminophenyl)-3-methyl-5-aminopyrazole, 1-(3'-methylphenyl)-3-methyl-5-aminopyrazole, 1-(4'-ethoxyphenyl)-3-methyl-5-aminopyrazole, 1-(2'-methoxy-5'-methylphenyl)-3-methyl-5-aminopyrazole, 1-cyclohexyl-3-methyl-5-aminopyrazole, 1-(4'-methylphenyl)-3-methyl-5-aminopyrazole, 1-(4'-methoxyphenyl)-3-methyl-5-aminopyrazole, 1-(2',6'-dimethylphenyl)-3-methyl-5-aminopyrazole, 1-(2-chlorophenyl)-3-methyl-5-aminopyrazole, 1-(3-chlorophenyl)-3-methyl-5-aminopyrazole, 1-(4-chlorophenyl)-3-methyl-5-aminopyrazole, 1-(3-nitrophenyl)-3-methyl-5-aminopyrazole, 1-(4-nitrophenyl)-3-methyl-5-aminopyrazole, 1-(2-trifluoromethylphenyl)-3-methyl-5-aminopyrazole and 1-(2,5-dichlorophenyl)-3-methyl-5-aminopyrazole.

The dyestuffs according to the invention are suitable for dyeing natural and synthetic fibre materials, especially for dyeing polyamide fibres in level yellow shades of good yield and very good fastness to light. They are well absorbed on polyamide fibres even in a neutral to weakly acid dye bath. By polyamide fibres there are here in particular understood fibres of synthetic polyamides such as ε-polycaprolactam or condensation products of adipic acid and hexamethylenediamine. The dyestuffs are used both in the form of the free acid and in the form of their salts, especially the alkali metal salts, preferably the sodium, potassium or lithium salts as well as ammonium salts.

EXAMPLE 1

36.3 g of N-methyl-N-(4-amino-3,5-dichloro-phenyl-sulphonyl)-2-aminoethanesulphonic acid are dissolved, at pH 7, in 200 ml of water by means of sodium hydroxide solution, 7.0 g of sodium nitrite are added, after cooling to 5° C 30 g of hydrochloric acid (37% strength) are added and diazotisation is carried out for 15 minutes at 0°-5° C. Thereafter a solution of 21.6 g of 1-phenyl-3-methyl-5-aminopyrazole hydrochloride in 150 ml of water is added to the clear diazo solution and the mixture is buffered with sodium acetate solution. After completion of coupling the dyestuff, which in the form of the free acid corresponds to the formula

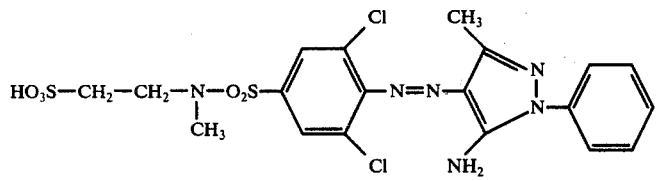

is filtered off and dried. It dyes polyamide fibres and polyamide fabrics from a weakly acid or neutral bath in a greenish-tinged yellow of very good fastness to light.

EXAMPLE 2

29.9 g of 4-amino-3,5-dichloro-benzenesulphonic acid N-methyl-N-(2-hydroxy-ethyl)-amide are dissolved in 80 ml of concentrated sulphuric acid and esterified for 1 hour at 50° C. For diazotisation, the solution is cooled to 0°-5° C and 35 g of nitrosylsulphuric acid are added dropwise at this temperture. After completion of the diazotisation, the solution is poured out onto ice and a solution of 21.6 g of 1-phenyl-3-methyl-5-aminopyrazole hydrochloride in 100 ml of water is added. The mixture is neutralised to pH 7 with dilute sodium hydroxide solution. After completion of coupling the dyestuff, which in the form of the free acid corresponds to the formula

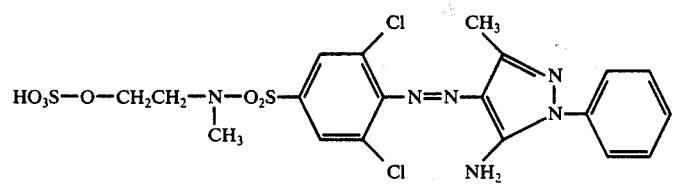

is isolated and dried. It dyes polyamide fabric, from a weakly acid or neutral bath, in greenish-tinged yellow shades of very good fastness to light.

EXAMPLE 3

49.9 g of the well-dried monoazo dyestuff manufactured by diazotisation of 4-amino-3,5-dichloro-benzenesulphonic acid N-ethyl-(N-2-hydroxyethyl)-amide and coupling to 1-phenyl-3-methyl-5-aminopyrazole are dissolved in 150 ml of concentrated sulphuric acid and the solution is stirred for 1 hour at 50° C and then poured out onto 2 liters of ice/water. The dyestuff which has precipitated, of the formula

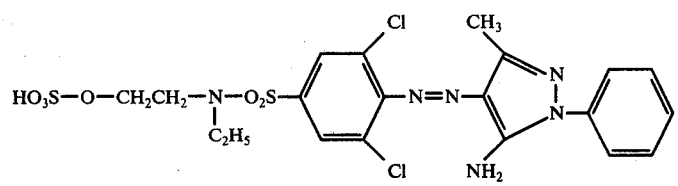

is filtered off and dried. It dyes polyamide fibres or polyamide fabric, from a weakly acid or neutral bath, in a greenish-tinged yellow of good fastness to light.

DYEING EXAMPLE 0.1 g of the dyestuff from Example 1 is dissolved in 100 ml of hot water, 5 ml of 10% strength ammonium acetate solution are added and the mixture is diluted to a volume of 500 ml with water. 10 g of polyamide fibre are introduced into the dye bath, the dye bath is brought to the boil over the course of 20 minutes, 4 ml of 10% strength acetic acid are added and the mixture is kept at the boil for one hour. Thereafter the fibres are rinsed and dried at 70° – 80° C. A dyeing in a greenish-tinged yellow shade of very good fastness to light and to wet processing is obtained.

If the procedure in Example 1 is followed but the compounds listed in Column I of the table which follows are employed as diazo components and the compounds listed in Column II of the table which follows are employed in coupling components, valuable water-soluble dyestuffs are again obtained, which dye polyamide from a weakly acid or neutral bath in yellow shades.

| | I | II |
|---|---|---|
| 4) | 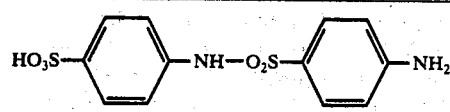 | 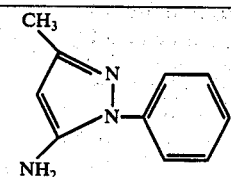 |
| 5) | " | 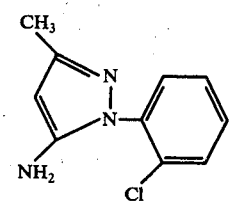 |
| 6) | " | 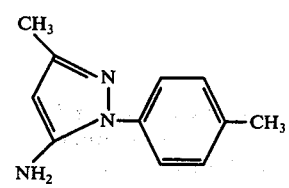 |
| 7) | " | 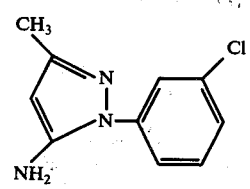 |
| 8) | " | 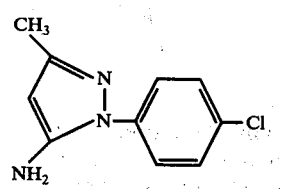 |
| 9) | " | 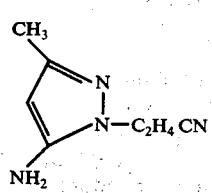 |
| 10) | 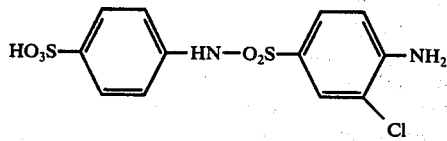 | 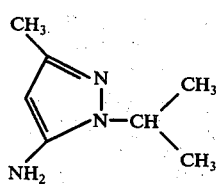 |
| 11) | " | 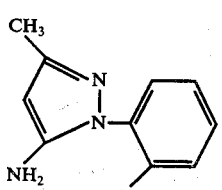 |
| 12) | " | 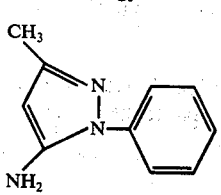 |

| | -continued | |
|---|---|---|
| | I | II |
| 13) | HO₃S—⟨phenyl⟩—HN—O₂S—⟨phenyl, 2-Cl, 4-NH₂⟩ | 3-CH₃, 5-NH₂, 1-phenyl pyrazole |
| 14) | " | 3-CH₃, 5-NH₂, 1H-pyrazole |
| 15) | " | 3-CH₃, 5-NH₂, 1-(α-methylbenzyl) pyrazole |
| 16) | HO₃S—⟨phenyl⟩—HN—O₂S—⟨phenyl, 2,5-diCl, 4-NH₂⟩ | 3-CH₃, 5-NH₂, 1-phenyl pyrazole |
| 17) | " | 3-CH₃, 5-NH₂, 1-(2-chlorophenyl) pyrazole |
| 18) | " | 3-CH₃, 5-NH₂, 1-(2-trifluoromethylphenyl) pyrazole |
| 19) | " | 3-C₂H₅, 5-NH₂, 1-phenyl pyrazole |
| 20) | " | 3-CH₃, 5-NH₂, 1-(3-chlorophenyl) pyrazole |
| 21) | " | 3-CH₃, 5-NH₂, 1-(4-chlorophenyl) pyrazole |

-continued
| I | II |
|---|---|
| 22) | " 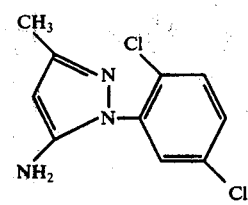 |
| 23) | " 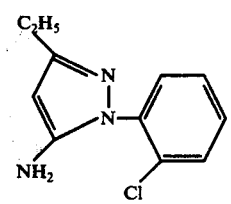 |
| 24) | " 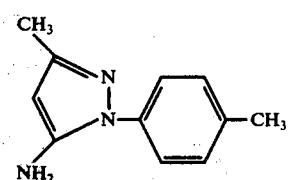 |
| 25) | " 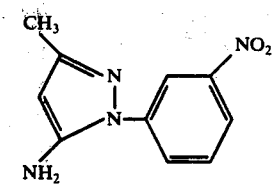 |
| 26) | " 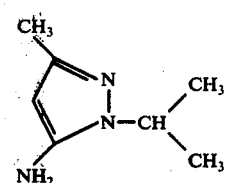 |
| 27) | " 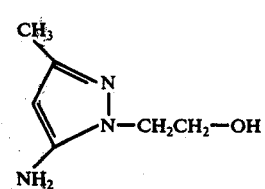 |
| 28) | " 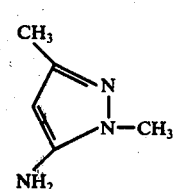 |
| 29) | " 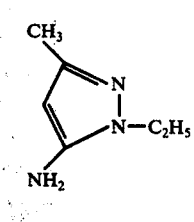 |

-continued
| | I | II |
|---|---|---|
| 30) | " | 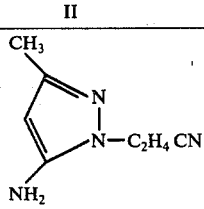 |
| 31) | " | 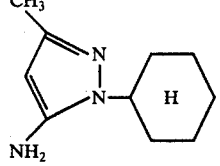 |
| 32) | " | 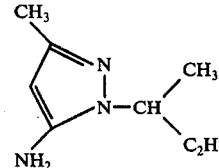 |
| 33) | " | 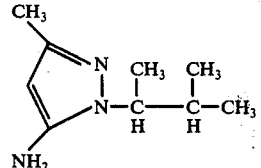 |
| 34) | " | 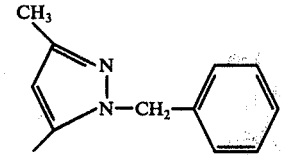 |
| 35) | " | 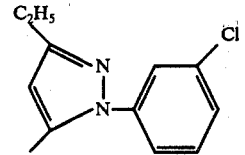 |
| 36) | 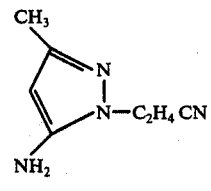 | 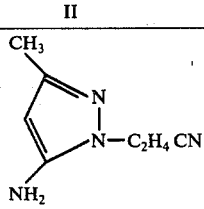 |
| 37) | " | 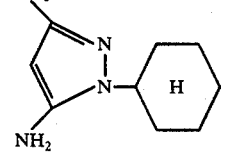 |
| 38) | " | 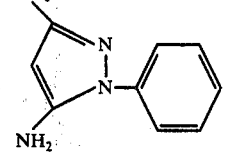 |

| | I | II |
|---|---|---|
| 39) | " | 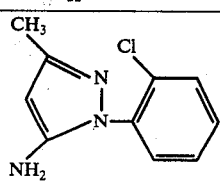 |
| 40) | " | 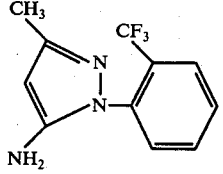 |
| 41) | " | 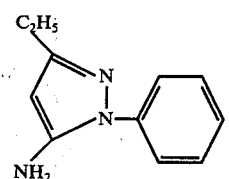 |
| 42) | " | 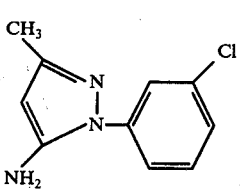 |
| 43) | " | 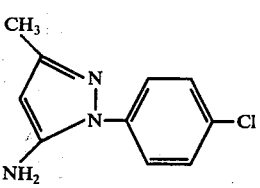 |
| 44) | " | 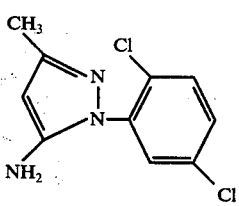 |
| 45) | 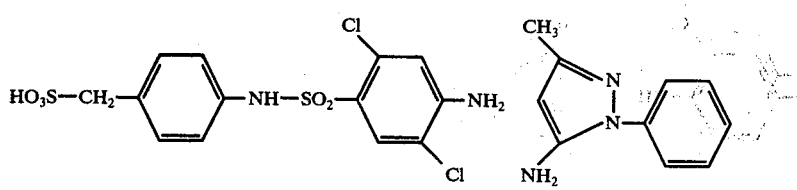 | |
| 46) | " | 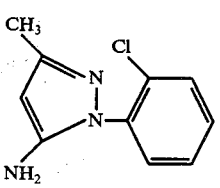 |
| 47) | " | 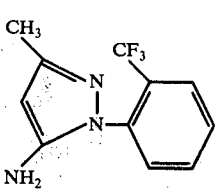 |

-continued
| | I | II |
|---|---|---|
| 48) | " | 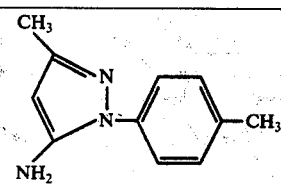 |
| 49) | " | 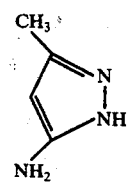 |
| 50) | " | 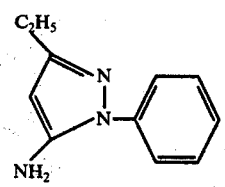 |
| 51) | 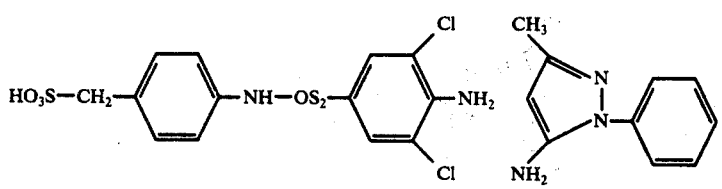 | |
| 52) | " | 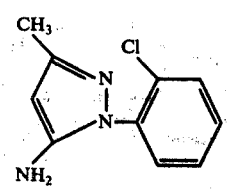 |
| 53) | 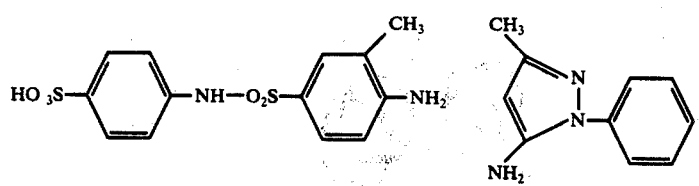 | |
| 54) | " | 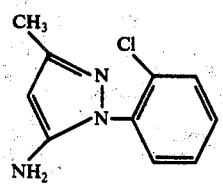 |
| 55) | 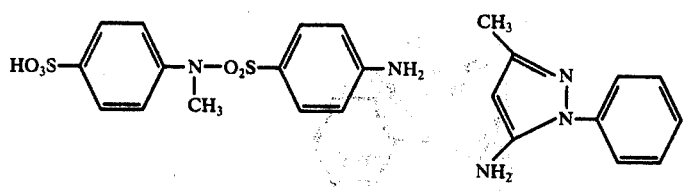 | |
| 56) | " | 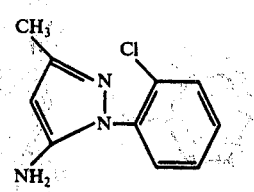 |

| | I | II |
|---|---|---|
| 57) | 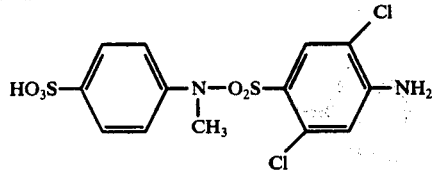 | 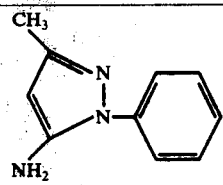 |
| 58) | " | 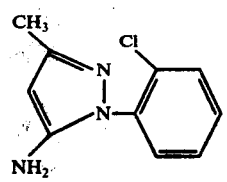 |
| 59) | " | 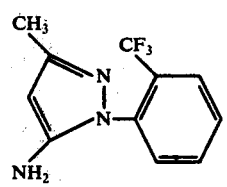 |
| 60) | " | 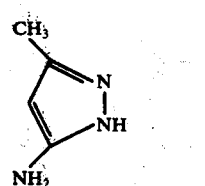 |
| 61) | 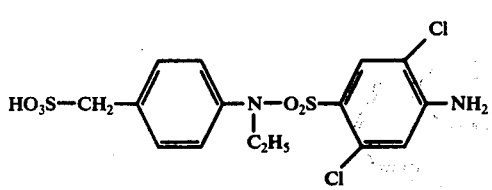 | 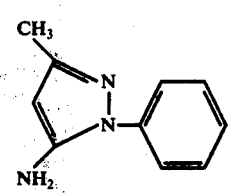 |
| 62) | " | 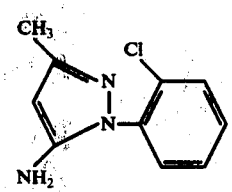 |
| 63) | 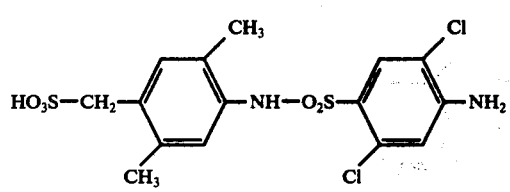 | 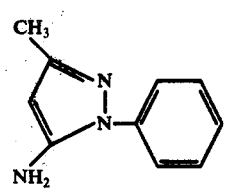 |
| 64) | " | 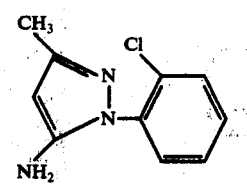 |
| 65) | 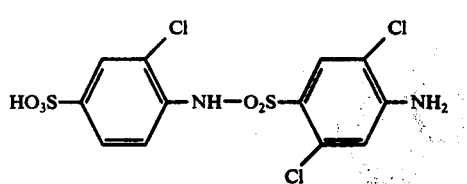 | 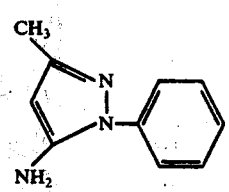 |

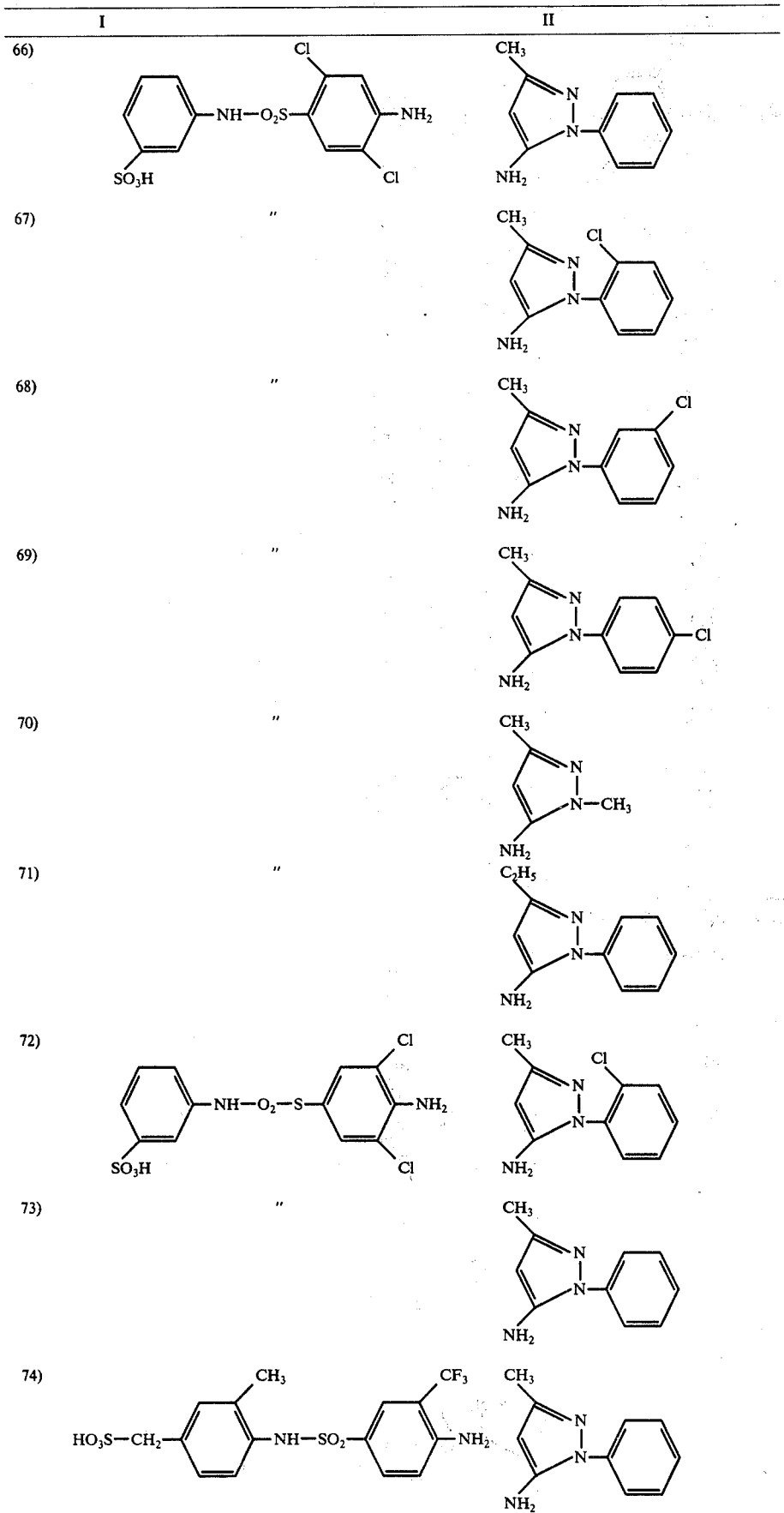

-continued

| | I | II |
|---|---|---|
| 75) | phenyl-O-C₆H₃(SO₃H)-NH-O₂S-C₆H₂(Cl)(Cl)-NH₂ (2,5-dichloro-4-amino) | 3-methyl-5-amino-1-phenylpyrazole |
| 76) | HO₃S-C₆H₄-NH-O₂S-C₆H₃(CF₃)-NH₂ | 3-methyl-5-amino-1-phenylpyrazole |
| 77) | " | 3-methyl-5-amino-1-(2-chlorophenyl)pyrazole |
| 78) | " | 3-methyl-5-amino-1-(3-chlorophenyl)pyrazole |
| 79) | " | 3-methyl-5-amino-1-(4-chlorophenyl)pyrazole |
| 80) | HO₃S-C₆H₄-NH-O₂S-C₆H₃(NH₂)(CF₃) | 3-methyl-5-amino-1H-pyrazole |
| 81) | " | 3-ethyl-5-amino-1-phenylpyrazole |
| 82) | " | 3-methyl-5-amino-1-(4-methylphenyl)pyrazole |
| 83) | " | 3-methyl-5-amino-1-cyclohexylpyrazole |

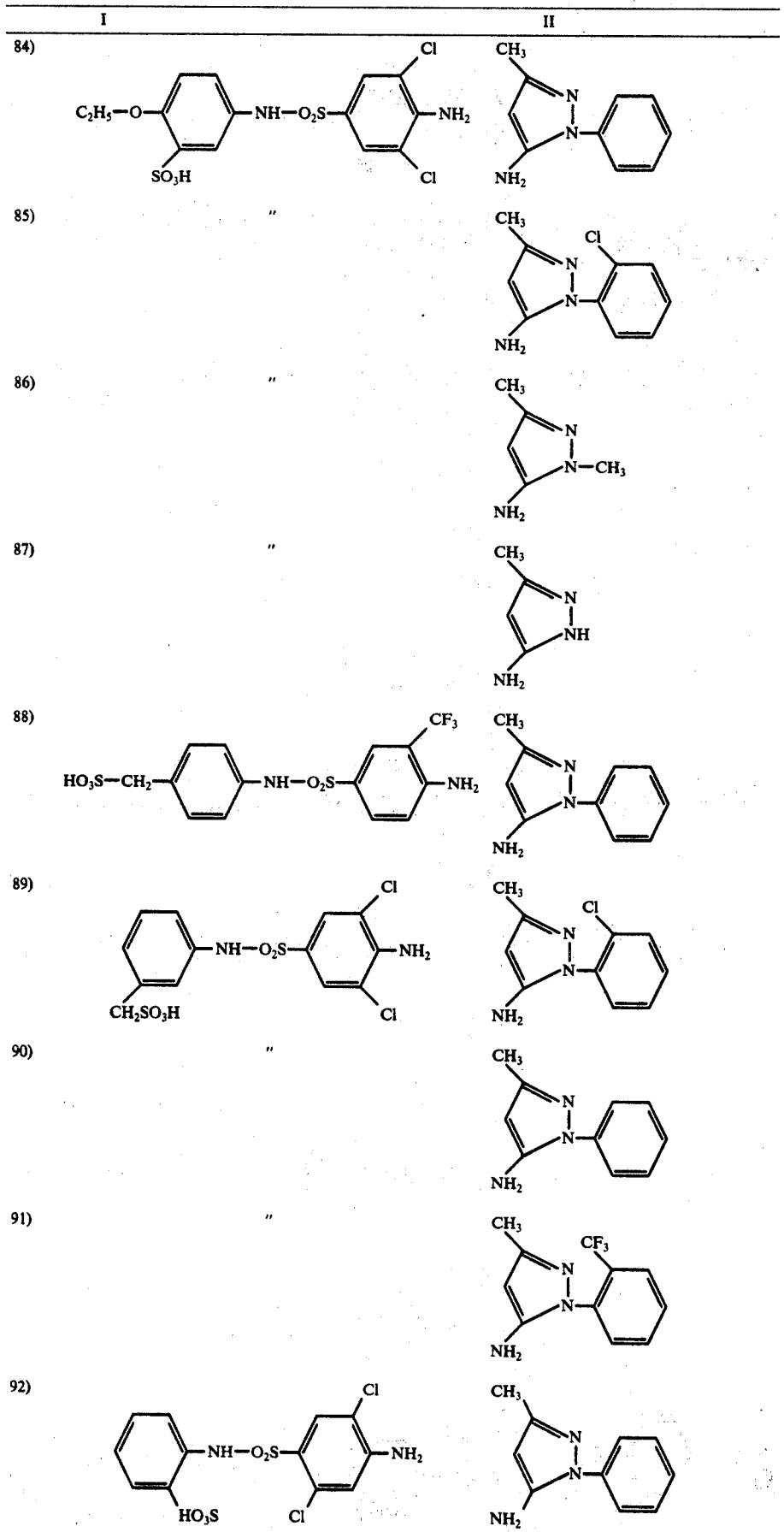

-continued

| | I | II |
|---|---|---|
| 93) | " | 3-methyl-1-(2-chlorophenyl)-5-aminopyrazole |
| 94) | HO₃S—O—CH₂CH₂—HN—O₂S—(3,5-dichloro-4-amino-phenyl) | 3-methyl-1-phenyl-5-aminopyrazole |
| 95) | " | 3-methyl-1-(2-chlorophenyl)-5-aminopyrazole |
| 96) | " | 3-methyl-1H-5-aminopyrazole |
| 97) | " | 3-methyl-1-(2-trifluoromethylphenyl)-5-aminopyrazole |
| 98) | " | 3-ethyl-1-phenyl-5-aminopyrazole |
| 99) | " | 1,3-dimethyl-5-aminopyrazole |
| 100) | " | 3-methyl-1-benzyl-5-aminopyrazole |
| 101) | " | 3-methyl-1-cyclohexyl-5-aminopyrazole |
| 102) | HO₃S—O—CH₂CH₂—N(CH₃)—O₂S—(3,5-dichloro-4-amino-phenyl) | 3-methyl-1-phenyl-5-aminopyrazole |

(Note: structures in column II are drawn as pyrazole rings with substituents as indicated.)

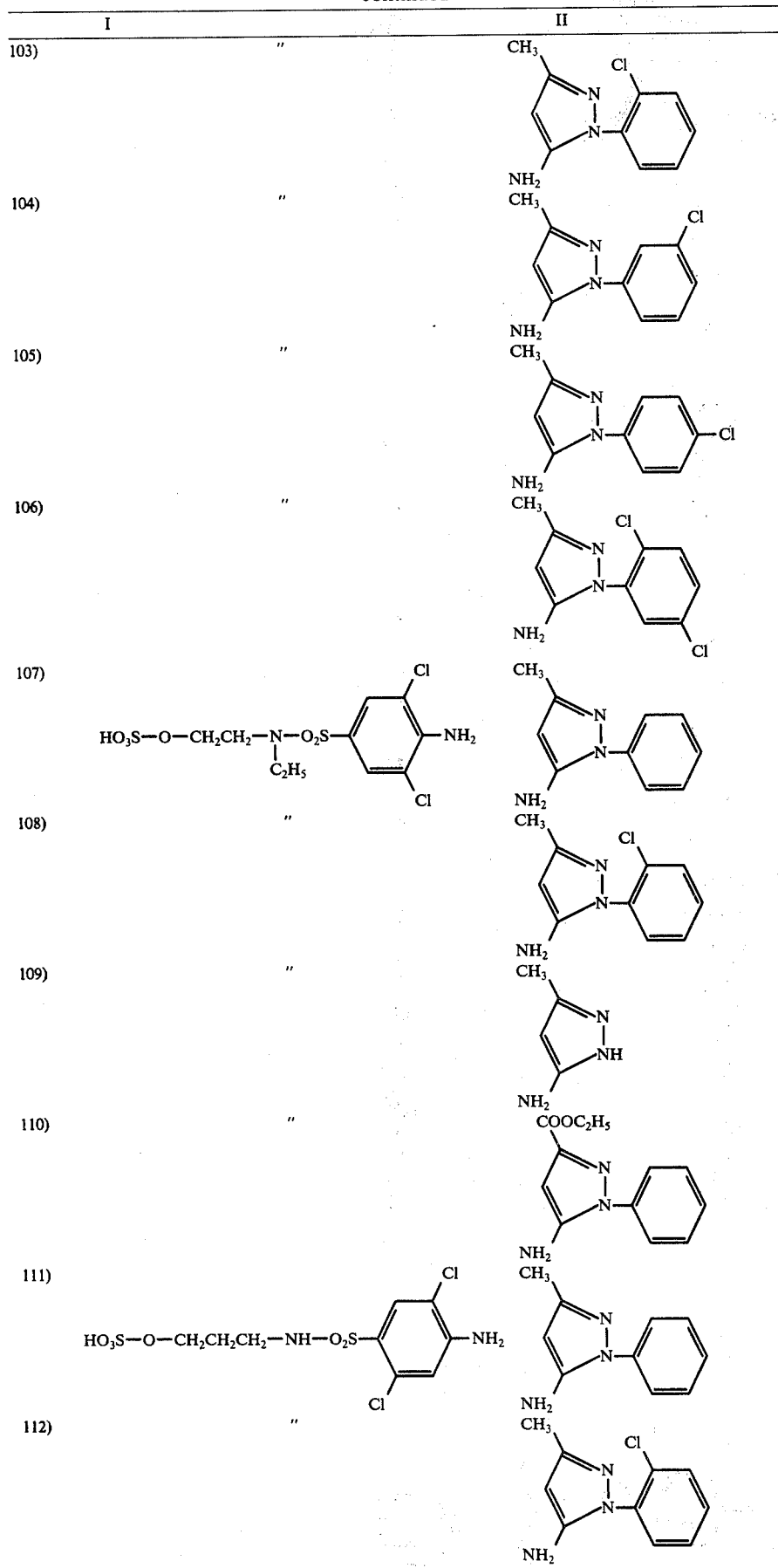

| | I | II |
|---|---|---|
| 113) | 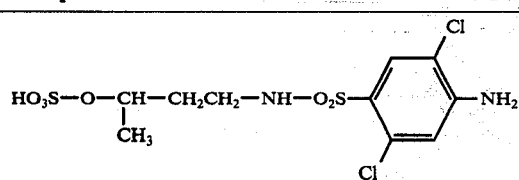 | 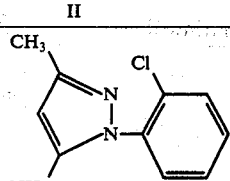 |
| 114) | " | 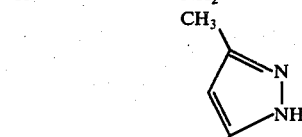 |
| 115) | 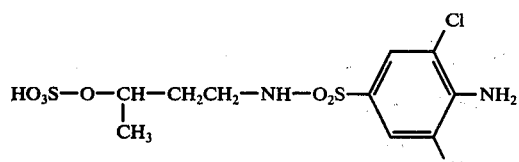 | 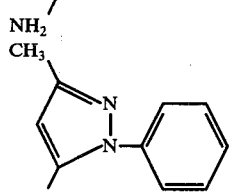 |
| 116) | " | 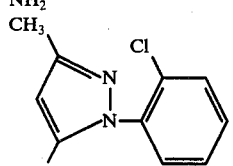 |
| 117) | " | 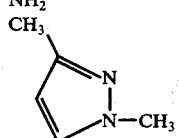 |
| 118) | 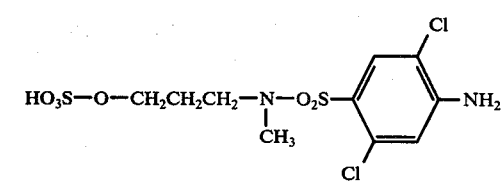 | 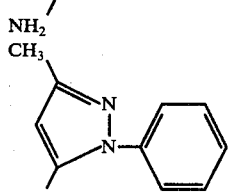 |
| 119) | " | 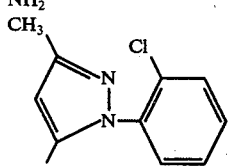 |
| 120) | 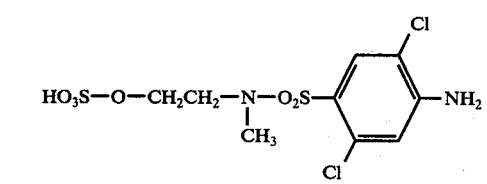 | 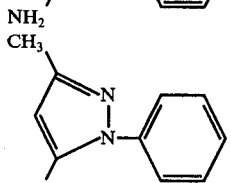 |
| 121) | " | 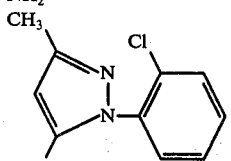 |
| 122) | 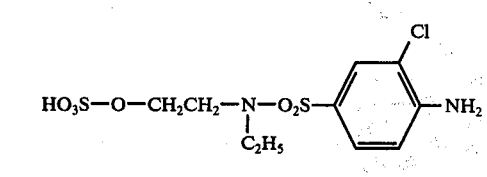 | 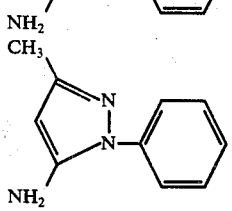 |

| I | II |
|---|---|
| 123) " | 3-methyl-5-amino-1H-pyrazole |
| 124) HO₃S—O—CH₂CH₂—N(CH₃)—OS₂—C₆H₃(CF₃)(NH₂) | 3-methyl-5-amino-1-phenylpyrazole |
| 125) " | 3-methyl-5-amino-1-(2-chlorophenyl)pyrazole |
| 126) HO₃S—O—CH₂CH₂—N(C₂H₅)—O₂S—C₆H₃(CH₃)(NH₂) | 3-methyl-5-amino-1-phenylpyrazole |
| 127) " | 3-methyl-5-amino-1-methylpyrazole |
| 128) HO₃S—O—CH₂CH₂—N(CH₂C₆H₅)—O₂S—C₆H₂(Cl)₂(NH₂) | 3-ethoxycarbonyl-5-amino-1-phenylpyrazole |
| 129) " | 3-methyl-5-amino-1-phenylpyrazole |
| 130) HO₃S—O—CH₂CH₂—NH—O₂S—C₆H₃(OCH₃)(NH₂) | 3-methyl-5-amino-1-phenylpyrazole |
| 131) " | 3-methyl-5-amino-1H-pyrazole |
| 132) HO₃S—O—CH₂CH₂—N(CH₃)—O₂S—C₆H₃(C₂H₅)(NH₂) | 3-methyl-5-amino-1-phenylpyrazole |

*Note: Structures in column I are diazo components bearing a sulfatoethylsulfamoyl group with various substituents on the aniline ring. Structures in column II are aminopyrazole coupling components.*

-continued
| | I | II |
|---|---|---|
| 133) | " | 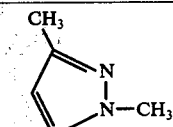 |
| 134) | 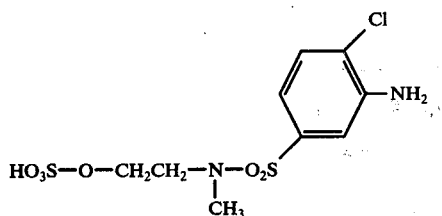 | 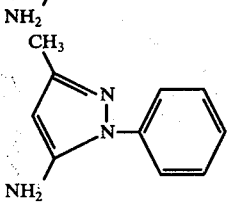 |
| 135) | 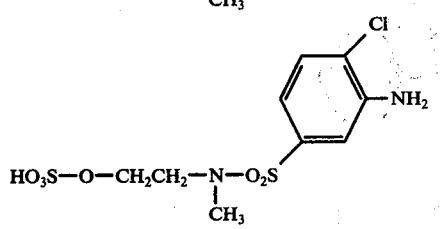 | 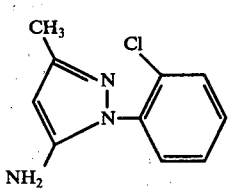 |
| 136) | 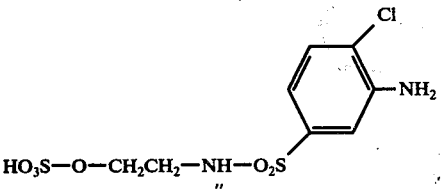 | 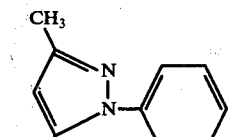 |
| 137) | | 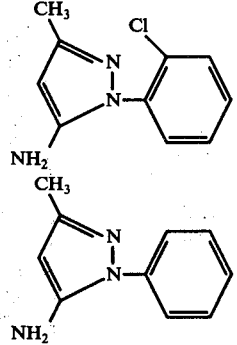 |
| 138) | 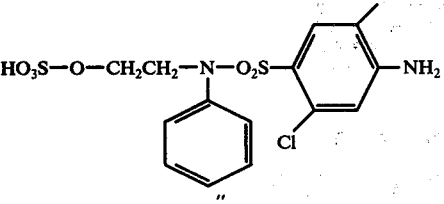 | 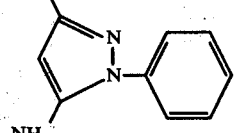 |
| 139) | " | 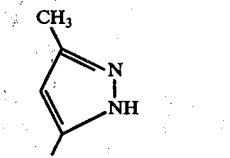 |
| 140) | " | 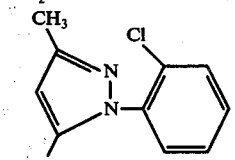 |
| 141) |  | 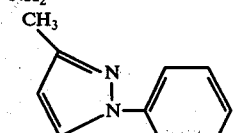 |

-continued

| | I | II |
|---|---|---|
| 142) | HO₃S—O—CH₂CH₂—N(—C₆H₃(CH₃))—O₂S—C₆H₂(Cl)₂(NH₂) | 3-COOC₂H₅, 5-NH₂, 1-phenyl pyrazole |
| 143) | " | 3-CH₃, 5-NH₂, 1-C₂H₄OH pyrazole |
| 144) | HO₃S—O—C₂H₄—N(—C₆H₄(OCH₃))—O₂S—C₆H₂(Cl)₂(NH₂) | 3-CH₃, 5-NH₂, 1-phenyl pyrazole |
| 145) | " | 3-CH₃, 5-NH₂, 1-(2-chlorophenyl) pyrazole |
| 146) | HO₃S—O—C₂H₄—N(—C₆H₄(Cl))—O₂S—C₆H₃(CF₃)(NH₂) | 3-CH₃, 5-NH₂, 1-phenyl pyrazole |
| 147) | " | 3-CH₃, 5-NH₂, 1-(2-chlorophenyl) pyrazole |
| 148) | HO₃S—O—C₂H₄—N(—C₆H₄(C₂H₅))—O₂S—C₆H₂(Cl)₂(NH₂) | 3-COOH, 5-NH₂, 1-phenyl pyrazole |
| 149) | HO₃S—O—C₂H₄—N(—C₆H₄(C₂H₅))—O₂S—C₆H₂(Cl)₂(NH₂) | 3-CONH₂, 5-NH₂, 1-phenyl pyrazole |

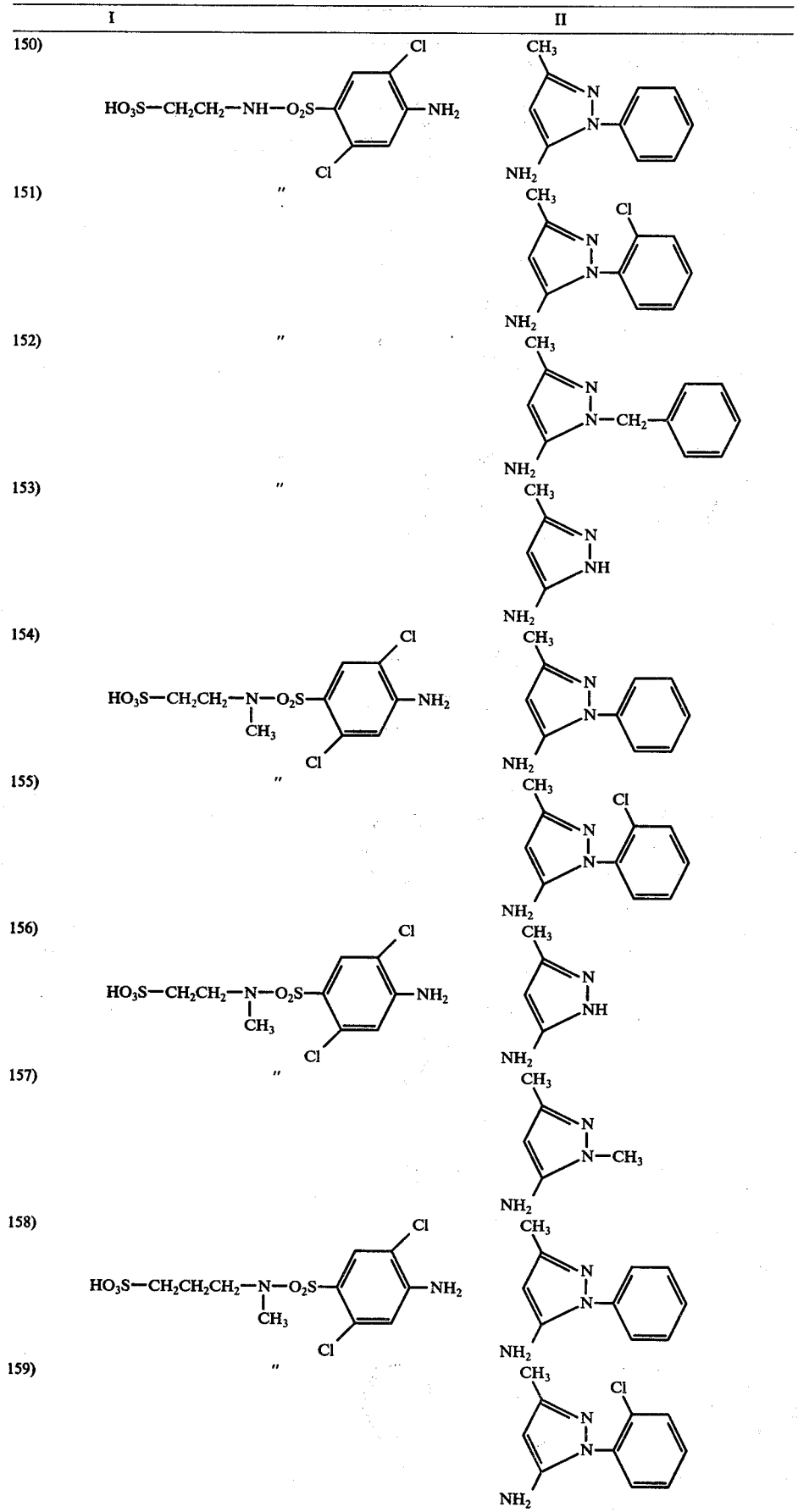

-continued
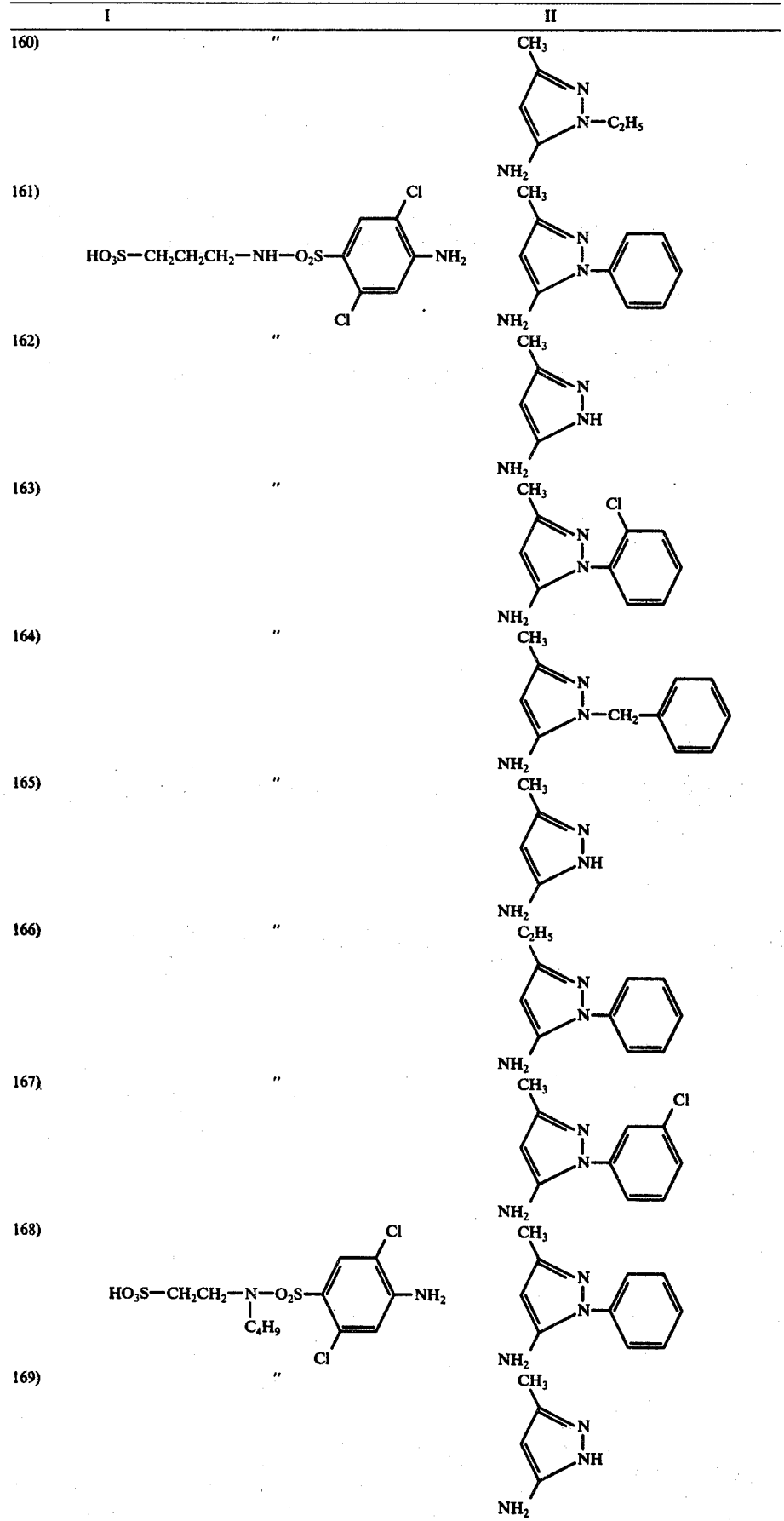

| | I | II |
|---|---|---|
| 170) | " | 3-CH₃, 1-CH₃, 5-NH₂ pyrazole |
| 171) | HO₃S—(CH₂)₄—NH—O₂S—(2,5-dichloro-4-amino-phenyl) | 3-CH₃, 1-phenyl, 5-NH₂ pyrazole |
| 172) | " | 3-CH₃, 1H, 5-NH₂ pyrazole |
| 173) | " | 3-CH₃, 1-CH₃, 5-NH₂ pyrazole |
| 174) | " | 3-CH₃, 1-(2-chlorophenyl), 5-NH₂ pyrazole |
| 175) | " | 3-C₂H₅, 1-phenyl, 5-NH₂ pyrazole |
| 176) | HO₃S—CH(CH₃)—CH₂CH₂—NH—O₂S—(2,5-dichloro-4-amino-phenyl) | 3-CH₃, 1-phenyl, 5-NH₂ pyrazole |
| 177) | " | 3-CH₃, 1-CH₂CH₂CN, 5-NH₂ pyrazole |
| 178) | " | 3-CH₃, 1H, 5-NH₂ pyrazole |
| 179) | HO₃S—CH₂CH₂CH₂—N(C₂H₅)—O₂S—(2,5-dichloro-4-amino-phenyl) | 3-CH₃, 1-phenyl, 5-NH₂ pyrazole |

-continued
| | I | II |
|---|---|---|
| 180) | " | 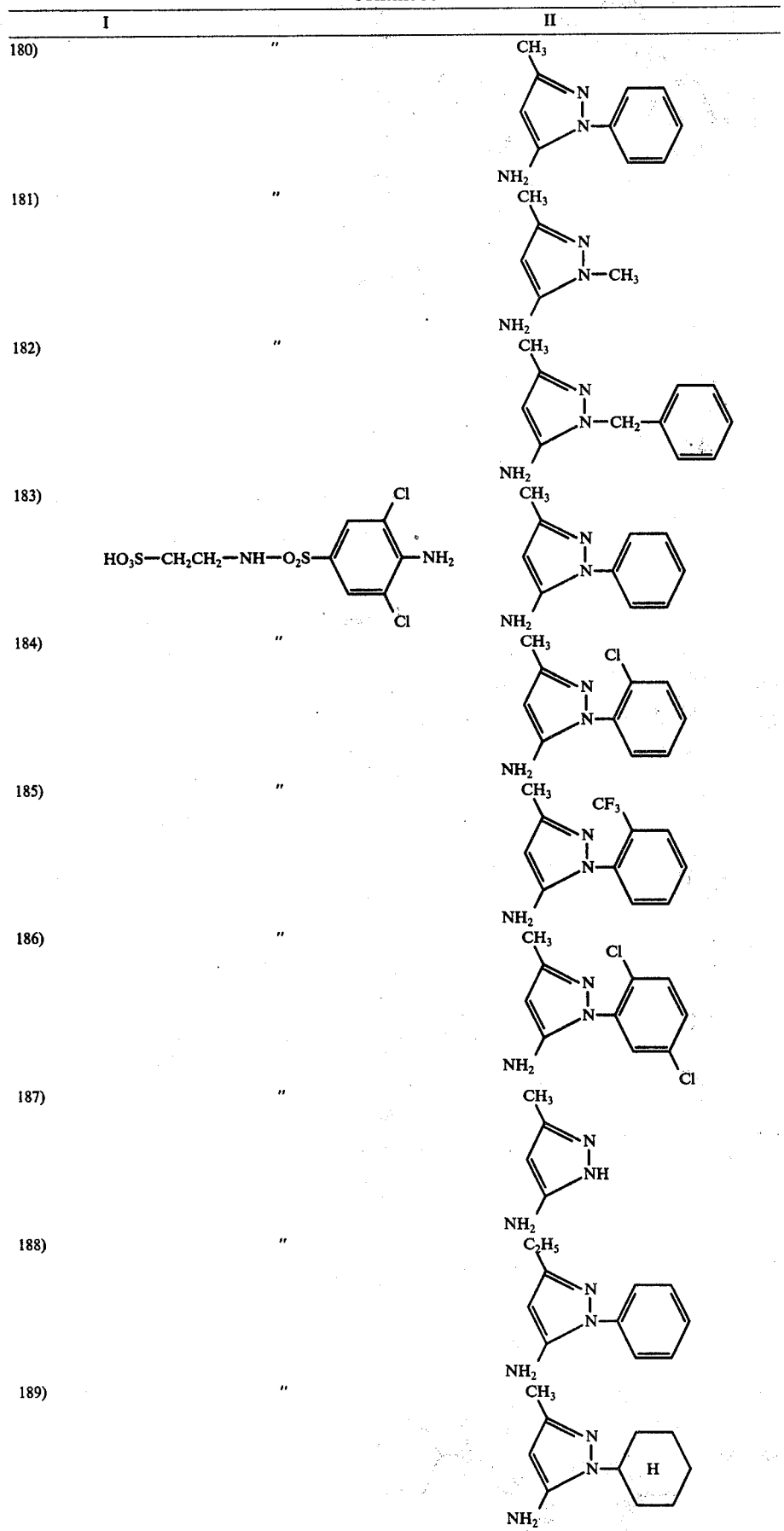 |
| 181) | " | |
| 182) | " | |
| 183) | HO₃S—CH₂CH₂—NH—O₂S—(3,5-Cl₂-4-NH₂-phenyl) | |
| 184) | " | |
| 185) | " | |
| 186) | " | |
| 187) | " | |
| 188) | " | |
| 189) | " | |

-continued
| | I | II |
|---|---|---|
| 190) | 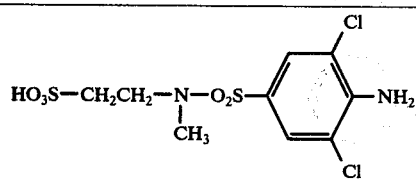 | 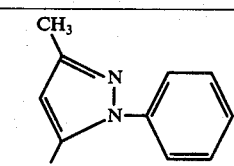 |
| 191) | | 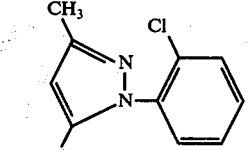 |
| 192) | | 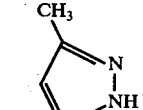 |
| 193) | " | 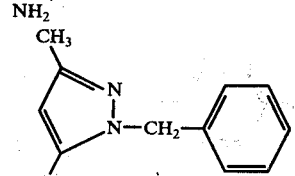 |
| 194) | 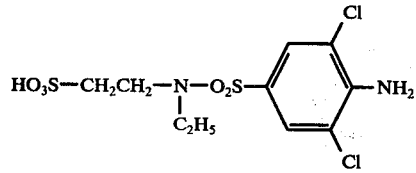 | 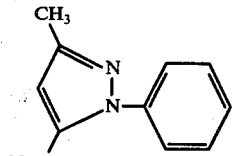 |
| 195) | " | 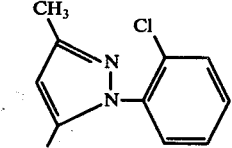 |
| 196) | " | 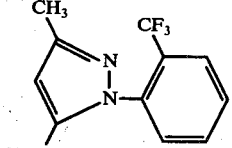 |
| 197) | 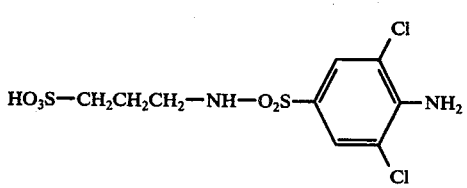 | 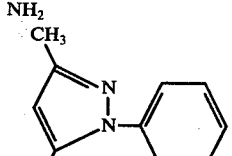 |
| 198) | " | 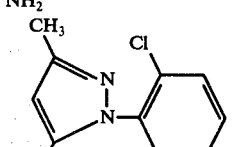 |
| 199) | 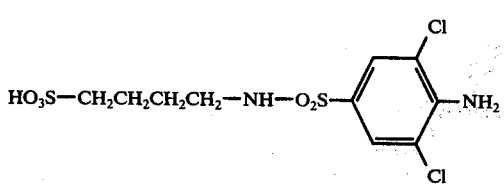 | 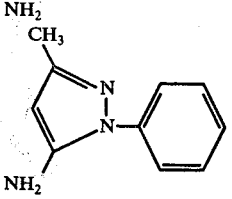 |

-continued

| I | II |
|---|---|
| 200) HO₃S—CH₂CH₂CH₂CH₂—NH—O₂S— (3,5-dichloro-4-amino-phenyl) | (3-chloro-1-(2-chlorophenyl)-5-amino-pyrazole) |
| 201) " | (3-methyl-5-amino-1H-pyrazole) |

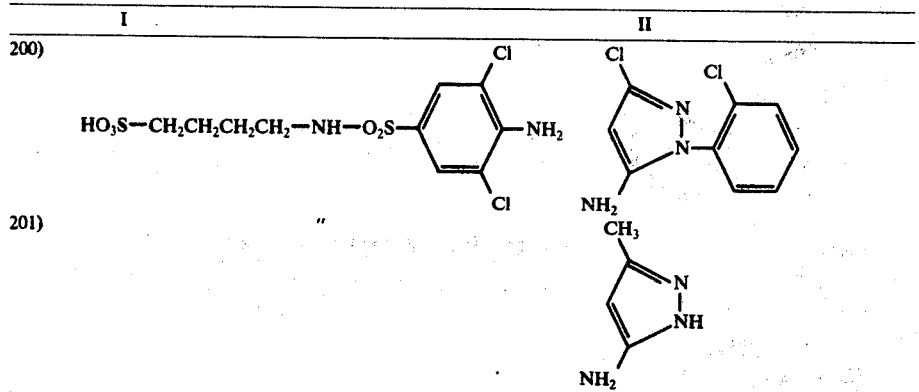

EXAMPLE 202

Preparation of N-(4-amino-2,5-dichloro-phenyl-sulphonyl)-aminoethanesulphonic acid.

The diazo component used in Example 150 is prepared in the following manner: 130 parts of 2,5-dichloro-4-acetylamino-benzenesulphochloride are introduced into 750 parts of a 15–20% strength aqueous taurine solution at 0° C and the mixture is stirred for a further 3 hours at 0° C and 1 hour at 80° C. Thereafter concentrated hydrochloric acid is added, in the cold, until the product precipitates, and the colourless product is filtered off.

We claim:
1. Dyestuff of the formula

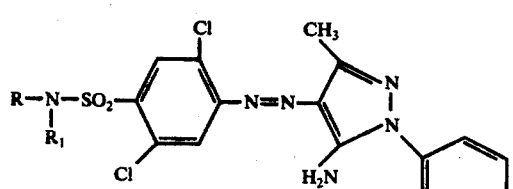

wherein
R is

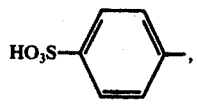,

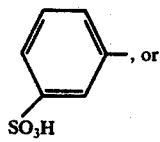, or $HO_3S-C_2H_4-$;
$R_1$ is H or $CH_3$; and
X is H or Cl.

2. Dyestuff of claim 1 of the formula

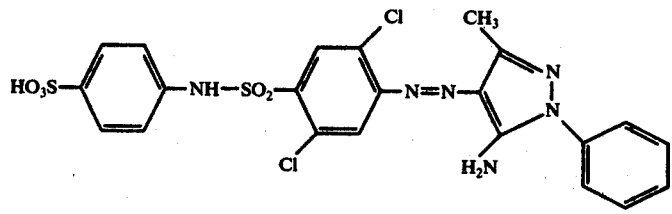

3. Dyestuff of claim 1 of the formula

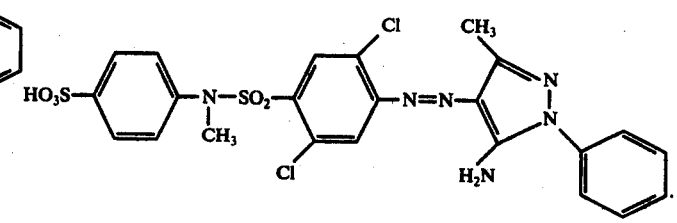

4. Dyestuff of claim 1 of the formula

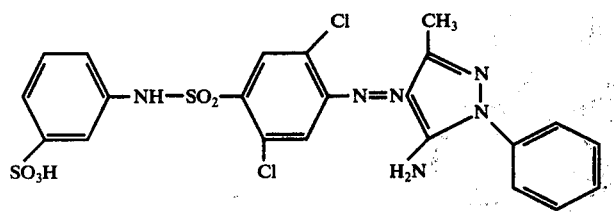
5. Dyestuff of claim 1 of the formula
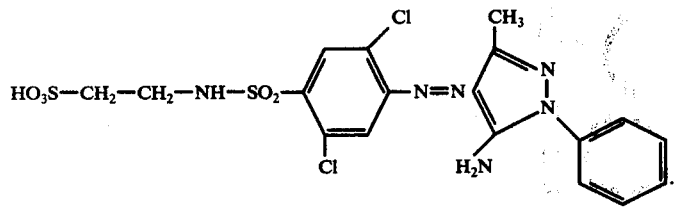
6. Dyestuff of claim 1 of the formula
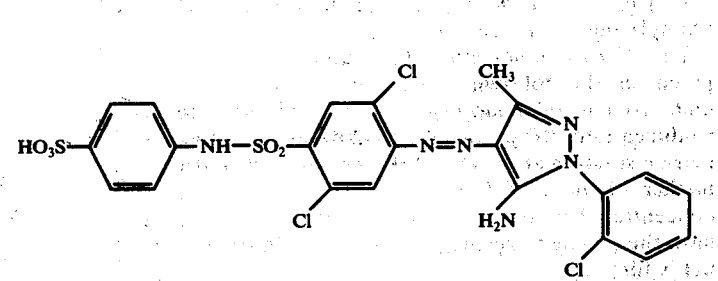
* * * * *